United States Patent
Fortmann et al.

(10) Patent No.: US 10,258,197 B1
(45) Date of Patent: Apr. 16, 2019

(54) MODULAR HOLDING CABINET

(71) Applicant: Carter-Hoffmann, LLC, Mundelein, IL (US)

(72) Inventors: Robert C. Fortmann, Grayslake, IL (US); Frank G. Marolda, Vernon Hills, IL (US)

(73) Assignee: Carter-Hoffmann LLC, Mundelein, IL (US)

( * ) Notice: Subject to any disclaimer, the term of this patent is extended or adjusted under 35 U.S.C. 154(b) by 352 days.

(21) Appl. No.: 15/202,775

(22) Filed: Jul. 6, 2016

Related U.S. Application Data

(60) Provisional application No. 62/193,992, filed on Jul. 17, 2015.

(51) Int. Cl.
*A47J 39/00* (2006.01)
*A47B 81/00* (2006.01)

(52) U.S. Cl.
CPC .............. *A47J 39/006* (2013.01); *A47B 81/00* (2013.01); *A47B 2220/0091* (2013.01)

(58) Field of Classification Search
CPC ........ A47J 39/006; A47J 39/02; A47J 39/025; A47J 36/06; A47J 36/10; A47J 36/24; A47J 36/2433; A47J 36/2461; A47J 36/2466; A47B 81/00; A47B 2220/0091
See application file for complete search history.

(56) References Cited

U.S. PATENT DOCUMENTS

| | | | |
|---|---|---|---|
| 3,868,123 A | 2/1975 | Berg et al. | |
| 4,019,022 A | 4/1977 | Seider et al. | |
| 4,162,024 A | 7/1979 | Shanley | |
| 4,180,125 A | 12/1979 | Schulz et al. | |
| 4,194,109 A | 3/1980 | Springer | |

(Continued)

FOREIGN PATENT DOCUMENTS

| | | |
|---|---|---|
| DE | 28 10 685 A1 | 3/1978 |
| DE | 196 38 862 A1 | 9/1996 |

(Continued)

OTHER PUBLICATIONS

GEAppliances.com, GE Top-Freezer Refrigerators, Owner's Manual & Installation Instructions, Models 22, 25, 200D2462P001 Rev. 2, 49-60102-2, 02-02 JR, 32 pp.

(Continued)

*Primary Examiner* — Shawntina T Fuqua
(74) *Attorney, Agent, or Firm* — Brinks Gilson & Lione

(57) ABSTRACT

A modular holding cabinet is provided. The cabinet includes a housing defining an internal volume and an open front providing access into the internal volume. The housing supports at least one plate therewithin. The housing supports one or more end walls that are each aligned spaced outboard from an end face of a plate such that an air gap is established therebetween. The internal volume defines a plurality of discrete heating zones located above each of the one or more plates, each discrete heating zone receives heat from a first heater disposed within the respective plate and a plurality of second heaters disposed above the respective plate. The housing includes a plurality of displays and a plurality of inputs, with one of the plurality of displays and one of the plurality of inputs associated with each discrete heating zone.

16 Claims, 12 Drawing Sheets

(56) References Cited

U.S. PATENT DOCUMENTS

| | | |
|---|---|---|
| 4,225,204 A | 9/1980 | Bellavoine |
| 4,440,303 A | 4/1984 | Seager |
| 4,600,255 A | 7/1986 | Dubarko |
| 4,801,773 A | 1/1989 | Hanlon |
| 4,821,649 A | 4/1989 | Andersson |
| 4,969,569 A | 11/1990 | Anders |
| 5,016,756 A | 5/1991 | Wischhusen et al. |
| 5,040,856 A | 8/1991 | Wilkins et al. |
| 5,154,114 A | 10/1992 | Chang |
| 5,607,213 A | 3/1997 | Slivon et al. |
| 5,697,500 A | 12/1997 | Walker |
| 5,782,174 A | 7/1998 | Cohn et al. |
| 5,783,803 A | 7/1998 | Robards, Jr. |
| 5,852,967 A | 12/1998 | Fortmann et al. |
| 5,894,788 A | 4/1999 | Violi et al. |
| 6,111,224 A | 8/2000 | Witt |
| 6,116,154 A | 9/2000 | Vaseloff |
| 6,175,099 B1 | 1/2001 | Shei et al. |
| 6,412,403 B1 | 7/2002 | Veltrop |
| 6,540,098 B1 | 4/2003 | Jarvis et al. |
| 6,637,322 B2 | 10/2003 | Veltrop |
| 6,851,772 B2 | 2/2005 | Tippmann, Sr. |
| 6,878,391 B2 | 4/2005 | Veltrop |
| 6,884,451 B2 | 4/2005 | Veltrop |
| 2002/0094361 A1 | 7/2002 | Veltrop |
| 2002/0100756 A1 | 8/2002 | Veltrop |
| 2002/0102337 A1 | 8/2002 | Veltrop |
| 2009/0199725 A1* | 8/2009 | Veltrop ............... A47J 37/0623 99/483 |
| 2011/0283895 A1* | 11/2011 | Veltrop ............... A23L 3/005 99/451 |

FOREIGN PATENT DOCUMENTS

| | | |
|---|---|---|
| EP | 0 776 145 A1 | 11/1995 |
| JP | 53-18621 | 5/1978 |
| JP | 61023685 U | 2/1986 |
| JP | 5-28462 | 7/1993 |
| JP | 6209865 A | 8/1994 |
| JP | 7103642 A | 4/1995 |
| JP | 10288455 A | 10/1998 |
| WO | WO 00/57709 | 10/2000 |

OTHER PUBLICATIONS

Installation Instructions, 30" Built-In Trivection™ Wall Oven, JT930, JT980, ZET3038, ZET3058, 31-10663, 1-07 JR, 16 pp.

Gold Medal Funfood Equipment & Supplies, Cincinnati, OH 45241-4807 USA, Pizza Oven/Warmer Combo Instruction Manual, Model #5591, Part No. 42873, Revised Feb. 1998, 14 pp.

* cited by examiner

MODULAR HOLDING CABINET

CROSS-REFERENCE TO RELATED APPLICATIONS

This application claims priority from U.S. Provisional Application No. 62/193,992, filed Jul. 17, 2015, the entirety of which is fully incorporated by reference herein.

TECHNICAL FIELD

Modular holding cabinets are often used in commercial restaurant kitchens for food preparation lines where various different food products and ingredients are needed to be readily available for the food service professionals to access as they prepare food orders. Modular holding cabinets are normally used to receive food products that have previously been cooked in a heated environment where the food product can be quickly and efficiently prepared for sale or presentation to a customer.

BRIEF SUMMARY

A representative embodiment of the disclosure is provided. The embodiment includes a modular holding cabinet. The cabinet includes a housing comprising left and right side walls and a top wall above the left and right walls defining an internal volume therewithin and an open front that allows access into the internal volume. The housing supporting at least one plate disposed within the internal volume, the at least one plate extends between the left and right side walls and below the top wall. The housing supports one or more end walls that are each aligned in parallel with and spaced outboard from an end face of a respective one of the one or more plates such that an air gap is established therebetween. The internal volume defines a plurality of discrete heating zones located above each of the one or more plates, each of the one or more discrete heating zones are configured to selectively receive heat from a first heater disposed within the respective plate and one of a plurality of second heaters disposed above the respective plate, wherein each of the plurality of discrete heating zones includes a different one of the plurality of second heaters which is disposed vertically above the discrete heating zone. The housing further comprises a plurality of displays and a plurality of inputs, with one of the plurality of displays and one of the plurality of inputs associated with each discrete heating zone, wherein each input is configured to receive user inputs associated with the operation of the respective discrete heating zone, and wherein each input is associated with controlling an operation of at least the second heater associated with the respective discrete heating zone.

Advantages of the disclosed devices will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
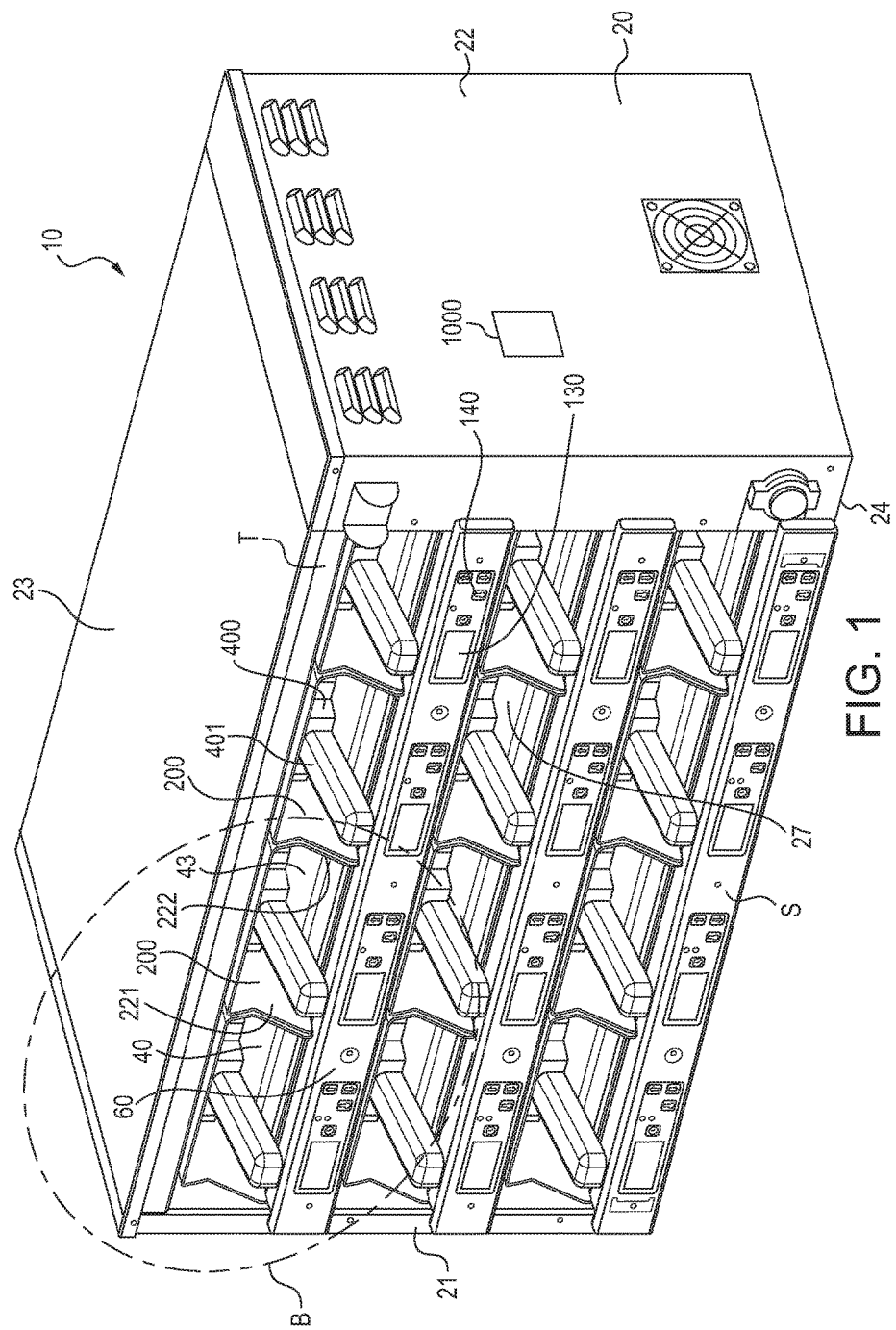
FIG. 1 is a perspective view of a modular holding cabinet.

Turning now to FIGS. 1-10, a modular holding cabinet 10 is provided. The modular holding cabinet 10 may be configured for use in the restaurant industry, such as the "fast food" industry or for other types of food service facilities, such as restaurants, cafeterias, banquet halls, or the like.

The modular holding cabinet 10 includes a housing 20 that is formed from left and right side walls 21, 22, a top wall 23, and a bottom wall 24. In some embodiments, some or all of these walls may be made from a single sheet of material, such as metal, while in other embodiments, some or all of these walls may be made from multiple sheets (or other geometries) of the same or different materials that are fixed together. In embodiments with multiple materials, some or all of the sheets may be disposed in parallel and either in contact with each other or may be spaced from each other. In some embodiments, other components may be associated with one or more of the left and right walls 21, 22, the top wall 23, and the bottom wall 24, such as insulation, electrical wiring, a controller 1000 (shown schematically in FIG. 1), or the like.

The housing 20 partially encloses an internal volume 27 therewithin, which is accessible through an open front 28 of the cabinet 10. In some embodiments, the internal volume 27 may also be accessible by a rear opening 29 that is defined on the opposite side of the housing 20 from the open front 28. The open front 28 (and rear opening 29, when provided) may be between the left and right walls 21, 22, below the top wall 23, and above the bottom wall 24.

The housing 20 includes one or more plates 40 that serve as shelves within the open volume 27. The plates 40 may be rigidly attached to one or both of the left and right walls 21, 22. In some embodiments one, some, or all of the plates 40 may be positioned in parallel with one or both of the top wall 23 and the bottom wall 24, and in some embodiments the one, all, or some of the plates 40 may be perpendicular to one or both of the left and right walls 21, 22.

Some or all of the plates 40 may extend to an end face, or end wall, 44 that establishes an end of the plate 40 that faces and is proximate to the open front 28. The end face 44 may extend along the entire width of each plate 40 between the left and right walls 21, 22. Some or all of the plates 40 may extend to a rear end face/wall 45 that is proximate to the open rear end 29 when provided.

In some embodiments, the cabinet 10 is configured such that each plate 40 establishes a plurality, such as 2, 3, 4, 5, or more discrete heating zones 100. Each discrete heating zone 100 may be disposed above a top surface 43 of one of the plates 40 and established below the plate 40 that is above the respective plate 40 (or top wall 23 in embodiments where the discrete heating zone 100 is established upon the upper most plate 40) within the internal volume 27. The discrete heating zones 100 are each configured such that a food product that is disposed within the discrete heating zone 100 (such as within a pan 400 that is disposed within the discrete heating zone 100 and rests upon the plate 40) is heated by the heat generated within the discrete heating zone 100. As discussed herein, the heat may be from the first (lower) heater 501 that is located within the plate 40 upon which the food product rests (normally within the pan 400), and the heat may additionally or alternatively be from the second (upper) heater 521 that is associated with the discrete heating zone 100 that is in the plate 40 (or top wall 23) that is above the food product. The first and second heaters 501 and 521, 522, 523, 524 are discussed in further detail below.

The cabinet 10 may further include one or more end walls 60 that are each aligned in parallel with and spaced outboard from an end face 44 of one of the respective plates 40, such that each plate 40 has one end wall 60 that is disposed outboard of it. All or a portion of the end wall 60 (as well as the similar rear wall 70, discussed below) may extend out of the housing 20 and specifically out of the internal volume of the cabinet, which is the heated environment of the housing 20. Each respective end wall 60 may be positioned with respect to each respective plate 40 such that an air gap, i.e. a space 80, is established therebetween, as best shown in FIGS. 4-8. In some embodiments, the air gap 80 may extend the entire distance between the left and right walls 21, 22, while in other embodiments, the air gap 80 may extend only a portion of the distance between the left and right walls 21, 22. In these embodiments, the air gap 80 may be discontinuous due to the placement of material within the space that would define the air gap (such as insulation, electrical conduit, or structure).

Figure 5:
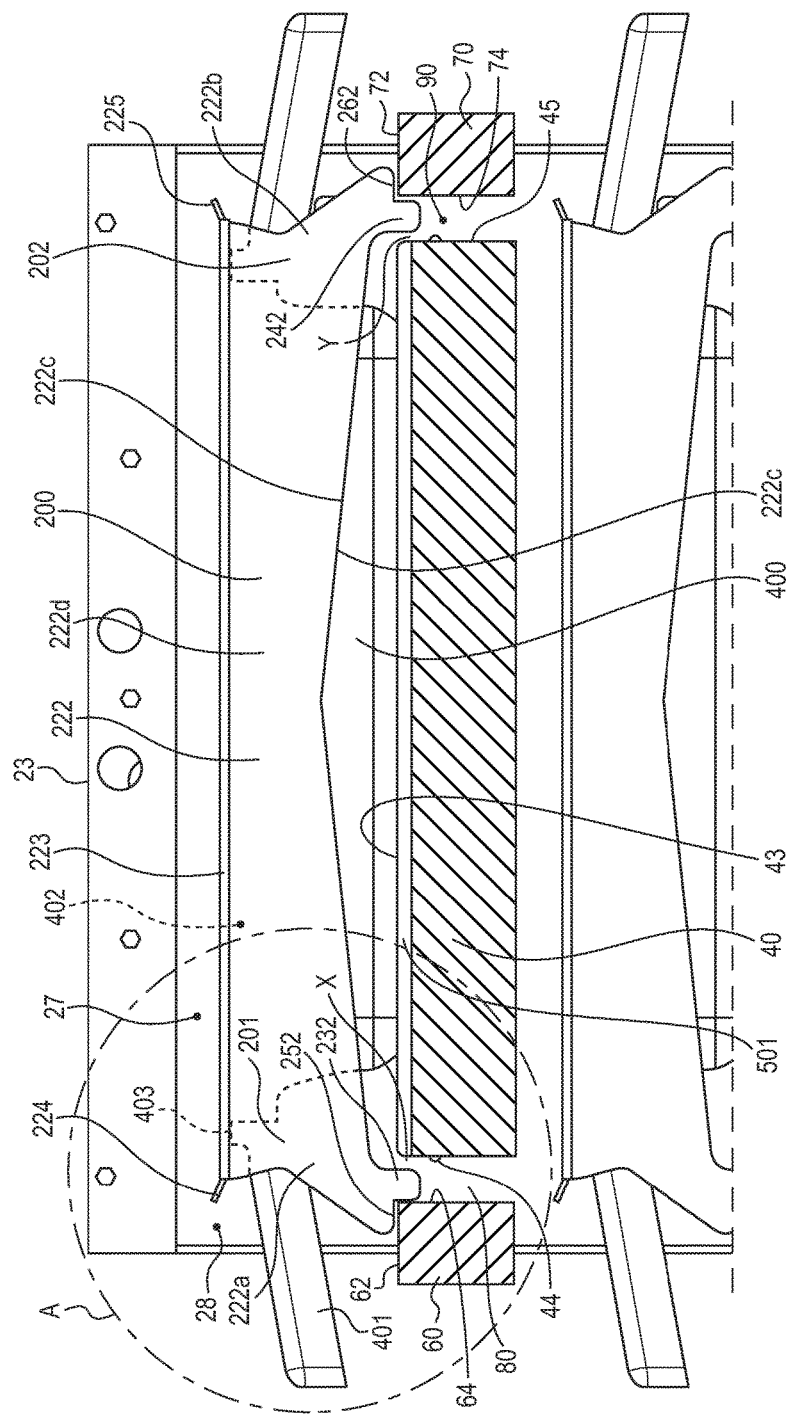
FIG. 5 is a cross-sectional view of the modular holding cabinet of FIG. 1 showing the pan disposed upon the plate and the pan closed by the cover.
Figure 5A:
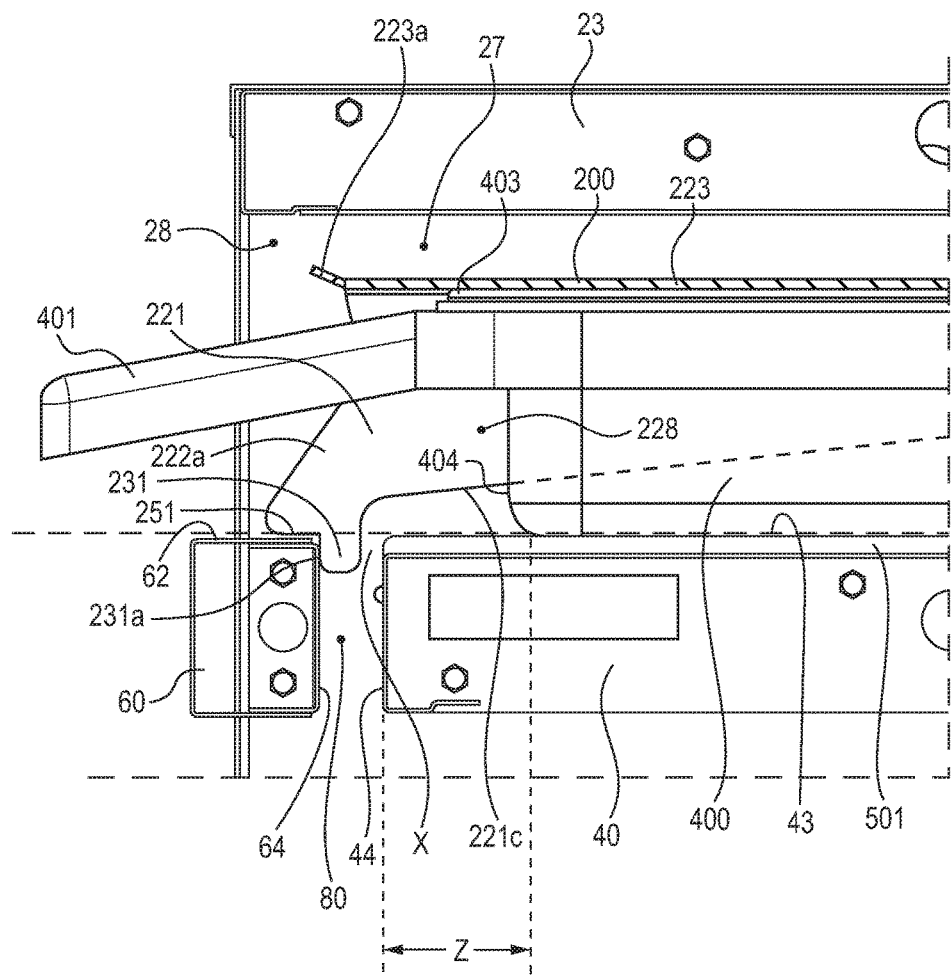
FIG. 5a is a view of detail A of FIG. 5 showing the cover cut to remove the right side wall.

In some embodiments, one or more of the end walls 60 may be disposed such that a top surface 62 of the end wall 60 is disposed along the same plane as the top surface 43 of the associated plate, as shown schematically in FIG. 5a.

Each end wall 60 may include a plurality of displays 130 and inputs 140, and more specifically, each end wall 60 may include a display 130 and input 140 that is associated with each discrete heating zone 100 that is provided above the plate 40. In these embodiments, the end bar 60 is a control bar. In other embodiments, the end walls 60 (other than the lower most end wall 60) and the top wall 23 may include a plurality of displays 130 and inputs 140 that are associated with the discrete heating zone 100 that is located below the specific plate 40 and top wall. With reference to FIG. 1, in this embodiment a plurality of displays 130 and inputs 140 would be positioned upon the top wall at position "T", and the displays 130 and inputs 140 that are depicted at position "S" in FIG. 1 would not be provided. In still other embodiments, the displays 130 and inputs 140 associated with each of the discrete heating zones 100 in the housing may be disposed upon other surfaces than on the end wall 60, such as the side walls, or in a unified display and control device, such as a monitor and an input keyboard.

As mentioned above, in some embodiments, the housing 20 may include a rear opening 29 that provides for access to the plates 40, and more specifically to the discrete heating zones 100 above (and below) the plates 40. The rear opening 29 may be a full opening (other than the existence of the plates 40, and the rear end walls 70, discussed below). In these embodiments, the user may remove or insert pans 400 through the rear opening 29 as well as through the front opening 28. In other embodiments, a portion of the rear opening 29 may be blocked, such as with bars 700 (FIGS. 8 and 9) to prevent pans 400 from being withdrawn through the rear opening 29. In other embodiments, the housing 20 may not include a rear opening 29, but instead may include a rear wall (not shown) that further partially or fully encloses the internal volume 27 from the rear of the housing 20.

In embodiments where rear end walls 70 are provided in conjunction with one or more of the plates 40, the rear end walls 70 may be disposed outboard of the plate 40, and specifically a second end/face/wall 45 of the plate 40, to establish a second air gap 90 (i.e. a second space) between the respective rear end wall 70 and a second end face 45 of each plate 40, with the second end face 45 on an opposite side of the plate 40 from the first end face 44. When provided, the rear end walls may include a plurality of displays 130 and a plurality of inputs 140 that are associated with the discrete heating zones 100 that are above the plate 40 that is associated with the rear end wall 70 (or in other embodiments, the displays 130, and inputs 140 associated with the discrete heating zones 100 that are below the plate 40 with which the rear end wall 70 is associated). In embodiments where the plurality of displays 130 and inputs 140 are provided on both the front and rear end walls 60, 70, the respective displays 130 may be operated simultaneously, and one or both of the inputs 140 may be configured to accept user instructions.

In some embodiments, one or more of the rear end walls 70 may be disposed such that a top surface 73 of the rear end wall 70 is disposed along the same plane as the top surface 43 of the associated plate 40, as shown schematically in FIG. 5a.

Similar to the air gap 80 discussed above, in some embodiments the rear end wall 70 and the plate 40 may establish an air gap 90 that extends all of the way between the left and right side walls 21, 22, while in other embodiments, the air gap 90 may be discontinuous, and be oriented and provided (or not provided) in the same manner as the air gap 80 discussed above.

In some embodiments the holding cabinet 10 may include one or a plurality of removable covers 200 that are configured to be positioned within the open volume 27 and within one of the plurality of discrete heating zones 100. The cover extends between a first end 201 and a second end 202, and in some embodiments, the first and second ends 201, 202 of the cover may be symmetrical, such that, when the cover 200 is installed within the housing, either end may be disposed proximate to the open front portion 28 of the housing 20 with the opposite end proximate to the rear end of the housing 20.

The covers 200 may each include a top wall 223 and opposed left and right walls 221, 222 that each extend downwardly from the top wall 223. The left and right walls 221, 222 extend between front ends 221a, 222a and rear ends 221b, 222b with a central portion 222d (central portion of the left wall 221 like central portion 222d of the right wall 222) therebetween. The front and rear ends 223a, 223b of the top wall 223 each include an angled portion at the respective front and rear edge of the top wall, each angled portion is angled upwardly from the top wall 223.

The front ends 221a, 222a of the left and right side walls 221, 222 each include a horizontal ledge 251, 252 that is configured to rest upon the top surface 62 of the front wall 60 when the cover 200 is disposed within the housing and extends over the plate 40. A foot 231, 232 extends below the ledge 251, 252 and is positioned behind the ledge. Each foot 231, 232 is configured to extend into the front air gap 80, with a front edge 231a, 232a of each foot 231, 232 resting against a rear end 64 of the front wall 60. The foot 231, 232 when properly resting within the air gap 80 does not contact the front wall 44 of the plate 40, and a space X (FIG. 5 is established between each foot 231, 232 and the front wall 44 of the plate 40 when the cover 200 is properly installed.

The rear ends 221b, 222b of the left and right side walls 221, 222 are configured in the same manner as the front ends 221a, 222b. Specifically, the each rear end includes a horizontal ledge 261, 262 that that is configured to rest upon the top surface 72 of the rear wall 70 when the cover 200 is disposed within the housing and extends over the plate 40. A foot 241, 242 extends below the ledge 261, 262 and is positioned behind the ledge. Each foot 241, 242 is configured to extend into the rear air gap 90, with a rear edge 241a, 242a of each foot 241, 242 resting against a front end 74 of the rear wall 70. The foot 241, 242 when properly resting within the air gap 90 does not contact the rear side 45 of the plate 40, and a space Y (FIG. 5) is established between each foot 241, 242 and the rear side 45 of the plate 40 when the cover 200 is properly installed.

When the cover 200 is installed within the housing 20, the cover extends over the plate 40, but does not contact or engage the plate 40 in any manner.

The central portion 221d, 222d, specifically the portion inboard of each of the front and rear feet 231, 241 and 232, 242 of each of the left and right walls 221, 222 each include a bottom edge 221c, 222c that is scalloped upwardly as it extends between the feet, such that the bottom edge 221c, 222c does not contact or engage in any manner the plate 40. The bottom edge 221c, 222c of each wall may be curved or include straight portions, or a combination of both. In some embodiments, and as shown in FIG. 5 the central portion (222d specifically shown in the figure, but the central portion 221d of the left wall 221 is similar) includes straight edges that extend upwardly to a vertex at the center of the cover 200. In other embodiments, the scalloped portion may be horizontal along its length, at a height where the respective bottom edge 221d, 222d does not contact the top surface 43 or the ends 44, 45 of the plate 40 or otherwise engage the plate 40.

As can be understood with review of FIG. 5, the engagement of the feet 231, 232 into the air gaps 80, 90, and specifically the contact between the feet 231, 232 and the respective side wall 64, 74 of the respective front or end wall 60, 70 fixes the position of the cover 200 within the housing 20 and prevents the cover 200 from moving into and out of the housing 20 when pans 400 (which are positioned within a cover 200, as discussed below) are slidingly pulled out of and pushed into the housing 20, such as by the handle 401, when provided.

Figure 6:
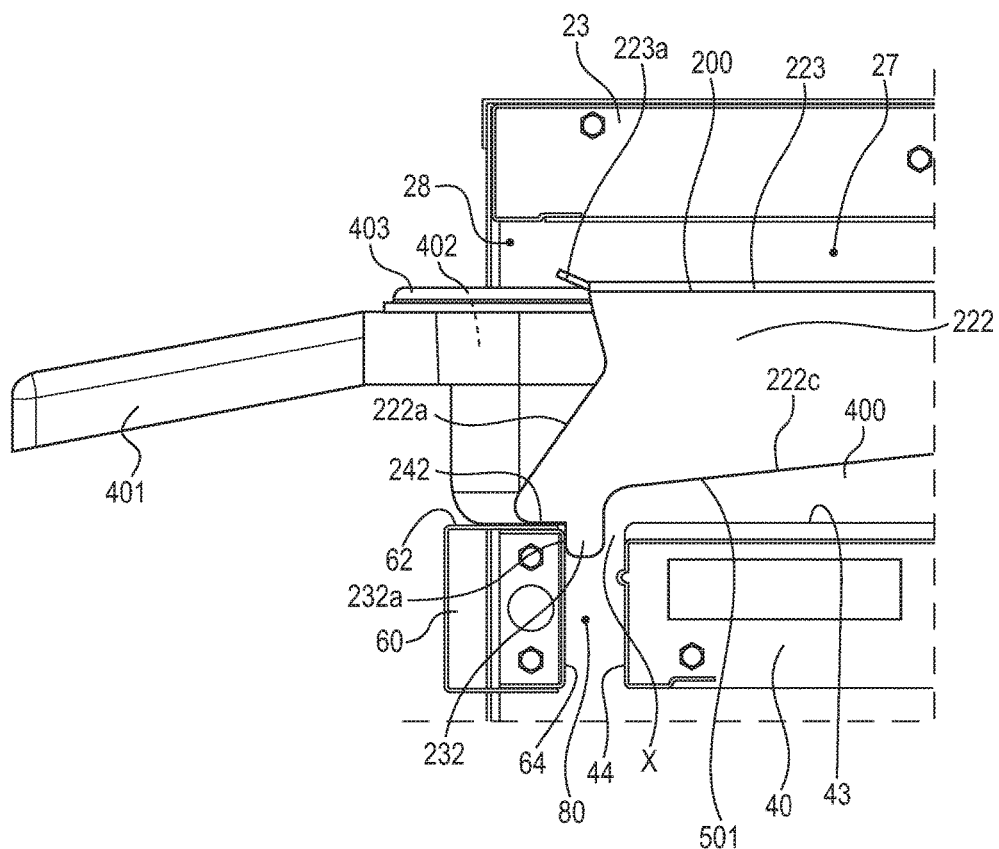
FIG. 6 is a detail cross-sectional view of the modular holding cabinet of FIG. 1 showing the pan disposed upon the control bar and the pan open.
Figure 9:
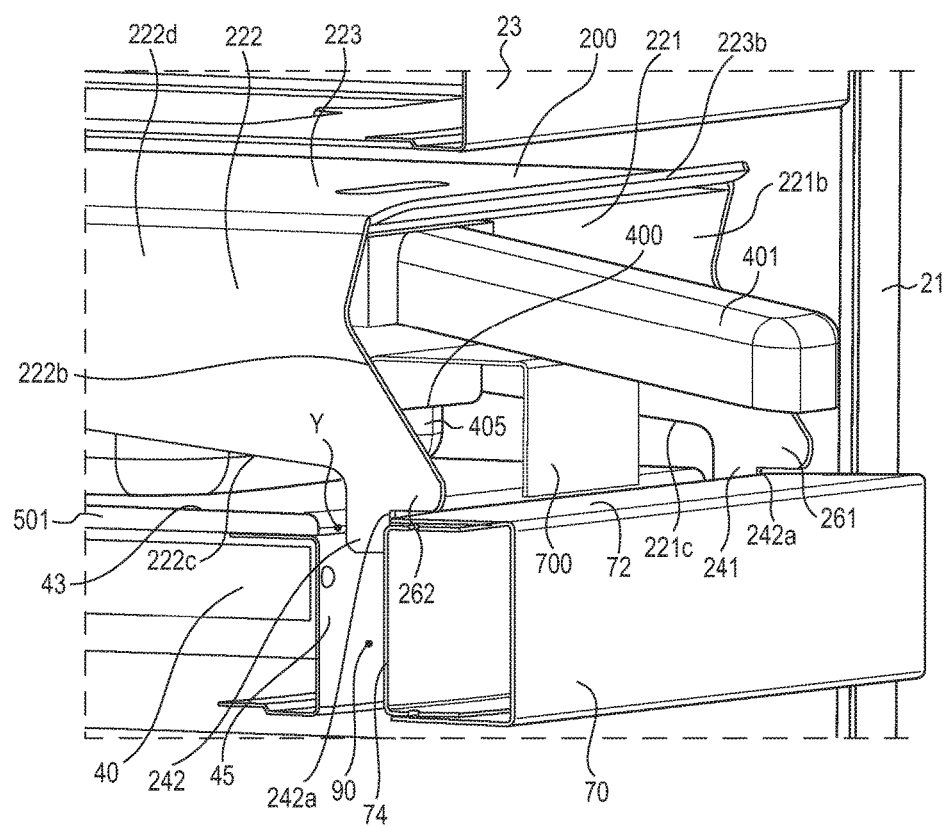
FIG. 9 is a perspective cross-sectional view of the modular holding cabinet of FIG. 1 showing the rear end of the cover engaging the rear bar.

As can be best appreciated with a review of FIGS. 5-6 and 9, the engagement between the feet 231, 232 and 241, 242 and the air gaps 80, 90 fixes the cover 200 longitudinally within the housing 20, while the cover 200 may be able to slide horizontally within the housing 20 such as toward or away from the left or right side walls 21, 22. In some embodiments, the housing 20 is sized so that when each discrete heating zone 100 receives a cover 200, the neighboring side walls of the covers contact each other or are in close proximity with each other, and in some embodiments, the side wall of the outermost covers contact the neighboring side wall of the housing 21, 22, such that the covers 200 are fixed horizontally. In some embodiments, the housing 20 may include one or more tracks or barriers that fix the covers 200 horizontally with respect to the desired discrete heating zone 100 when installed.

The covers 200 are configured to be removable from the housing 20 without any tools. Specifically, the cover 200 can be removed from the housing by raising the cover 200 upward within the internal volume 27 until the feet 231, 232, 24\1, 242 no longer extend within the respective air gap 80 (90), and then the cover 200 may be slidingly withdrawn from the internal volume 27. Conversely, the cover 200 may be slidingly installed into the internal volume 27, and slid until the feet 231, 232, 241, 242 extend into the air gap 80 (90).

Figure 5B:
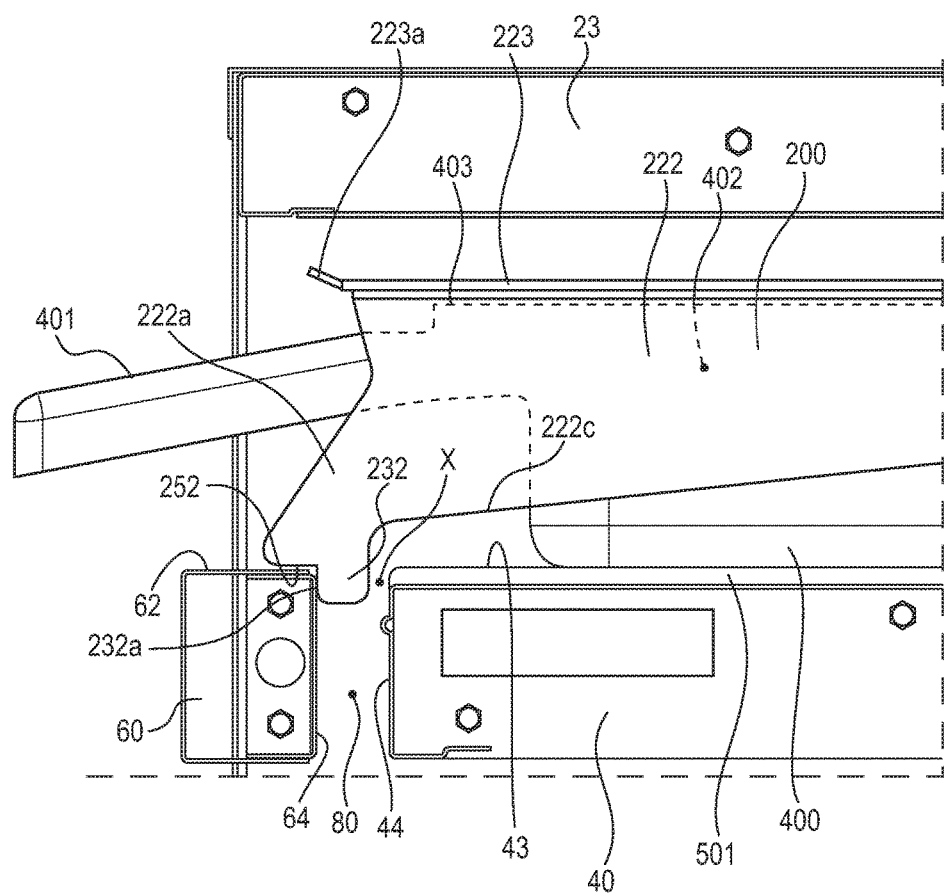
FIG. 5b is a view of detail A of FIG. 5.

The cover 200, container 400, and the plate 40 are configured such that the cover 200 closes a top opening 402 into the pan 400 when the container rests upon the plate 40, as shown in FIGS. 5-5b. As depicted in FIG. 5a, the front end 404 of the pan 400 is positioned upon the plate 40 such that the front end 404 of the pan is behind the front wall 44 of the plate by a distance Z. In some embodiments, the cover 200 (and specifically the top wall 223 of the cover 200), is configured such that the opening 402 into the pan 400 is fully closed by the top surface 223 (resting upon the top 403 of the pan) (therefore sealing the pan against humidity escaping from the volume of the pan 400) when the front end 404 of the pan rests upon the plate 40 such that the front surface of the pan 400 is aligned with or just slightly inboard of the front side 44 of the plate 40.

In other embodiments, the cover 200 may be configured such that the cover does not fully close the opening 402 into the pan 400 until the pan 400 is disposed rearwardly of the front end 44 of the plate, such as the distance Z, which may be 1, 2, 3, 4 inches or another suitable distance from the front wall 44. In this embodiment, user would be prompted to push the pan 400 further into the internal volume 27 in order to fully cover the opening 402 of the pan (than embodiments where the pan was fully closed when the front end 404 rested on or just rearwardly the front end wall 44 of the plate), which may make the entire pan 400 be maintained warmer (or be heated in a more thermal efficient manner) due to the heat loss through the open front 28 of the housing 20 or potentially less heat generation of the upper or lower heaters 521, 501 in the at the end of the plate than in the relative middle of the plate 40.

Figure 4:
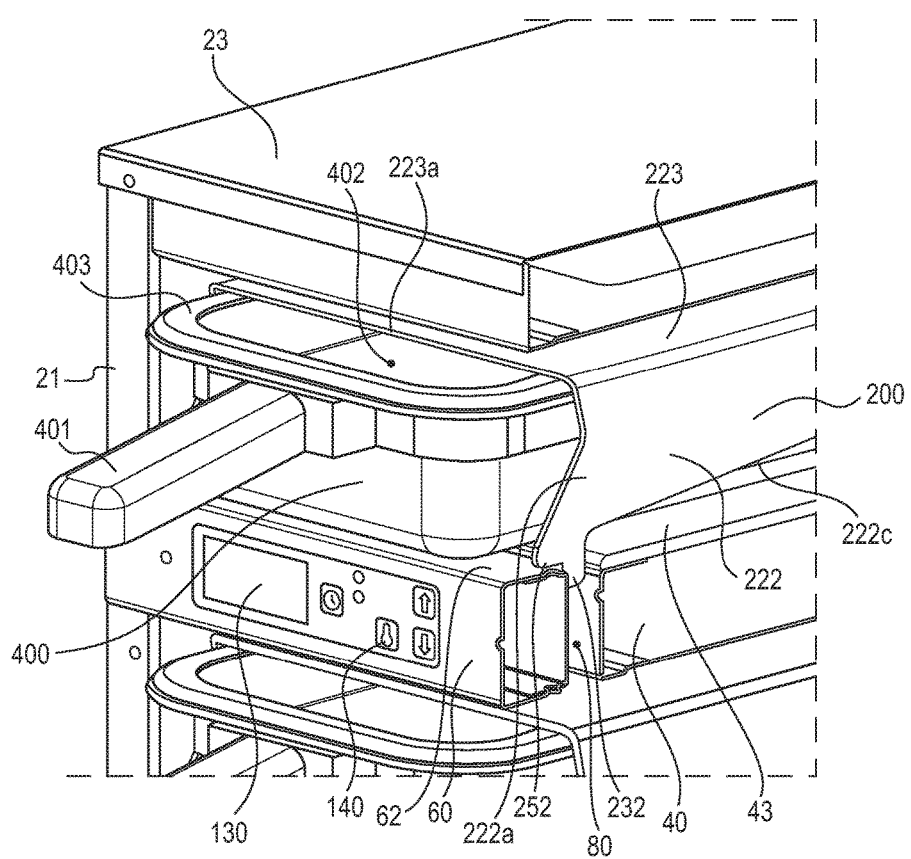
FIG. 4 is a perspective cross-sectional view of the modular holding cabinet of FIG. 1 showing a pan disposed on the control bar and the pan open.

As shown in FIGS. 4 and 6, the opening 402 of the pan 400 is exposed (allow access into the volume of the pan to add and remove food from the pan 400) when the pan rests upon the control bar 60. Specifically, when the pan (any portion of the pan) rests upon the control bar 60, the top surface 223 of the cover 200 does not extend completely over the opening 402. When the user desires to fully close the opening 402 of the pan from this position, the user pushes the pan 400 further onto the plate 40 until the top wall 223 of the cover 200 fully covers the opening into the pan 400, and when the pan 400 is entirely on the plate 40. It may be beneficial to design the cover 200 so that the pan 40 is partially open when the pan rests upon the control bar 60, because the control bar supports the pan 400 in this orientation thereby allowing the user to let go of the pan temporarily if their hand is needed for a cooking operation (with their opposite hand being used to add or remove food from the volume of the pan 400 through the opening), as well as to minimize the distance that the pan 400 needs to be withdraw from the discrete heating zone 100 to thereby minimize the amount of food within the pan 400 that leaves the discrete heating zone 100 while the cook temporarily pulls the pan 400 out to obtain some food within the pan.

While not specifically shown, in "pass-through" models of the cabinet 10, the opening 402 into the pan may be accessible when the pan 400 rests upon the rear bar (i.e. the orientation of FIGS. 4 and 6 as applied to the opposite end 405 of the pan and the rear bar 70), which would be beneficial in operation for the same reasons as discussed above. Similarly, in pass-through models of the cabinet, the cover 200, pan 400, and the plate 40 are configured such that opening 402 into the pan 400 is not closed (by the top wall 223 of the cover 200) until the pan fully rests upon the plate 40. In some embodiments, the opening 402 into the pan 400 isn't closed until the pan is rests upon the plate 40 past the rear end 45, such as a distance the same or similar to the distance Z of FIG. 5*a*, for the same reasons as discussed above.

Figure 7:
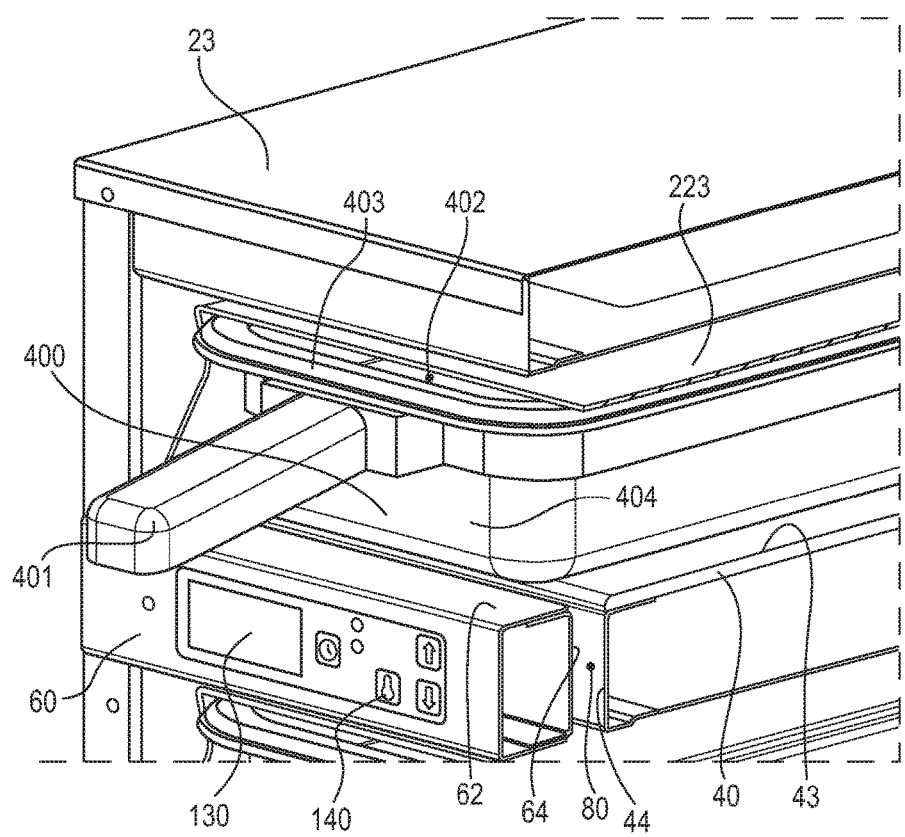
FIG. 7 is a perspective view of the modular holding cabinet of FIG. 1 showing the end of the pan disposed over the front air gap and the pan open.
Figure 8:
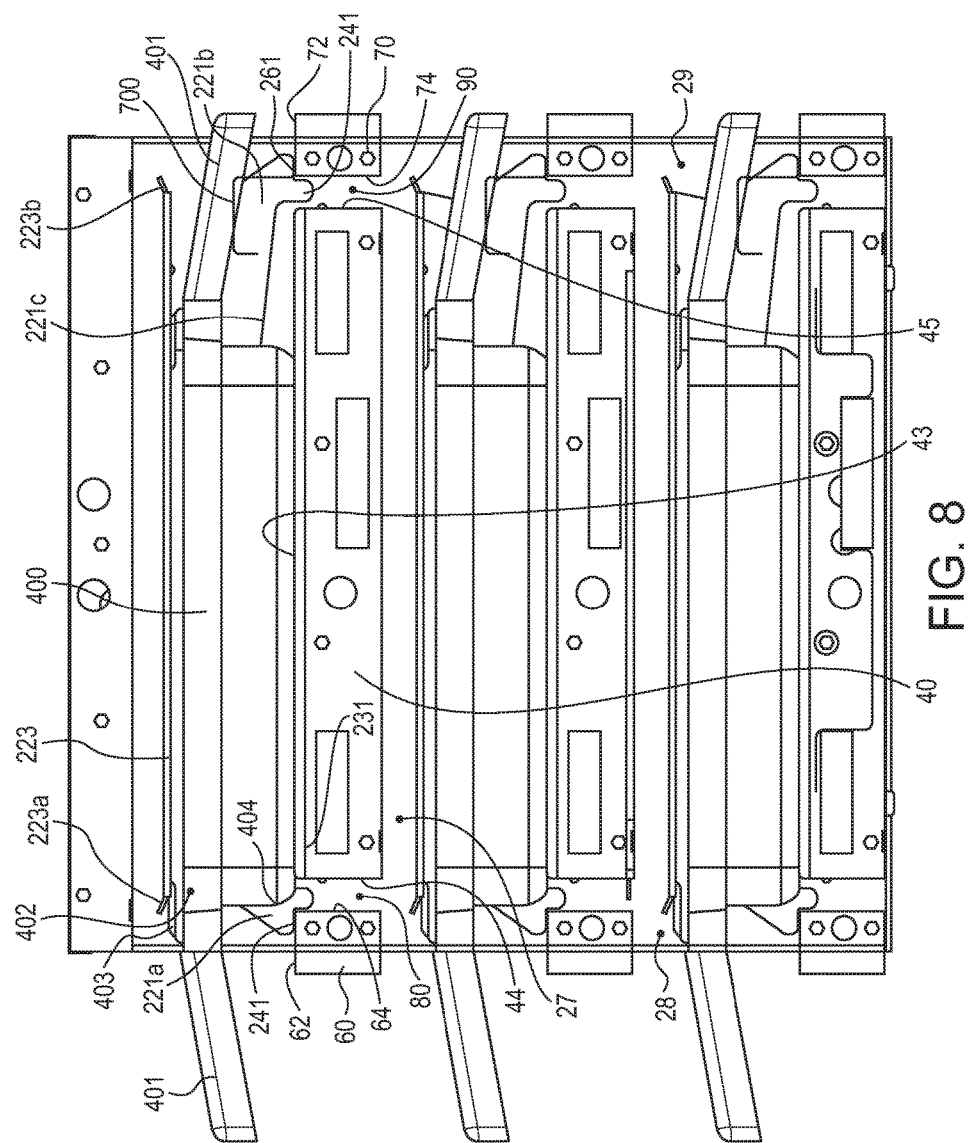
FIG. 8 is a cross-sectional view of the modular holding cabinet of FIG. 1 showing an end of each pan disposed over the front air gap and the pan open.

As FIGS. 7 and 8 provide views of the front end 404 of the pan 400 disposed above the air gap 80, and FIG. 7 shows that the opening 402 into the pan 400 is partially visible and therefore is not fully closed. In pass through embodiments, the opening 402 into the pan 400 would also not be fully closed when the opposite end 405 (FIG. 9) of the pan 400 is disposed over the rear air gap 90, and would be in a position similar to the position of FIGS. 7 and 8.

The covers 200, when provided, may be configured to partially enclose one of the discrete heating zones 100 and specifically the zone above the plate 40. The covers 200 may be sized to be larger than the pan 400 that is received within the cover and between the side walls 221, 222, or at least larger than the opening of the pan 400 to allow receipt of the food product therein. The covers 200 are sized such that the pan 400 can freely slide into and out of the cover 200 (such as with the handle 401), either with sliding contact between the pan 400 and the inner surfaces of the cover 200 (one, two or all of the left and right walls 221, 222 and the top wall 223), or with a space between the walls of the pan 400 and one, two, or all of the left and right walls 221, 222 and the top wall 223 of the cover 200.

As easily understood by one of ordinary skill, the covers 200 are readily removable and replaceable within the internal volume 27 of the housing 20, and the device 10 may be operated with some covers 200 enclosing some discrete heating zones 100 and other discrete heating zones 100 free of covers (but including pans 400). For example, when it is desired to heatingly store food products in a moist environment, the cover 200 may be installed in the discrete heating zone such to enclose (or only leave a small space above) the opening 402 into the pan 400 and to prevent moisture from the food products within the pan 400 from leaving the pan 400. In other words, the internal volume 228 of the cover 200 closely matches (and is slightly larger) than the geometry of the opening 402 into pan 400, and specifically, the top wall 223 of the cover 200 rests upon the top 403 of the pan 400 or is only slightly above the top 403 of the pan 400. Conversely, where a relatively dry environment is desired, the cover 200 may be removed from the discrete heating zone 100 to allow any moisture within the food product disposed within the opening 402 of the pan 400 to travel away from the pan 400 due to the large space between the pan's opening 402 and the bottom surface of the plate 40 (or the top wall 23) above the pan 400.

As discussed above, each plate 40 may include one or a plurality of discrete heating zones 100. As shown schematically in FIG. 2, discrete heating zones 100 may be positioned adjacent to each other upon a plate 40, with the width of two neighboring discrete heating zones identified by 100*w* and 100*w*' (and a portion of another neighboring zone depicted as 100*w*''), with the height of both of these discrete heating zones identified by 100*h*, i.e. above the plate 40 and below the top wall 23.

Figure 2:
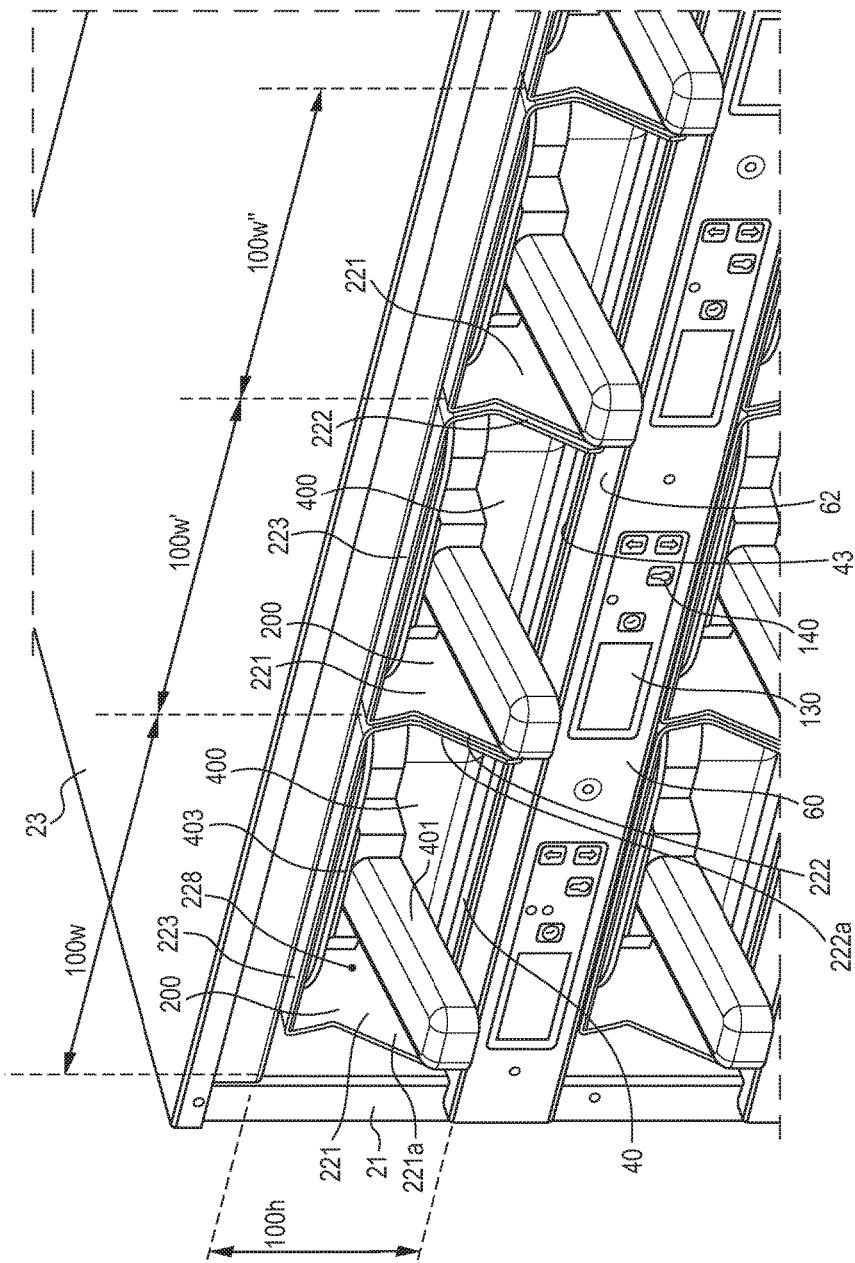
FIG. 2 is a view of detail B of FIG. 1.
Figure 3:
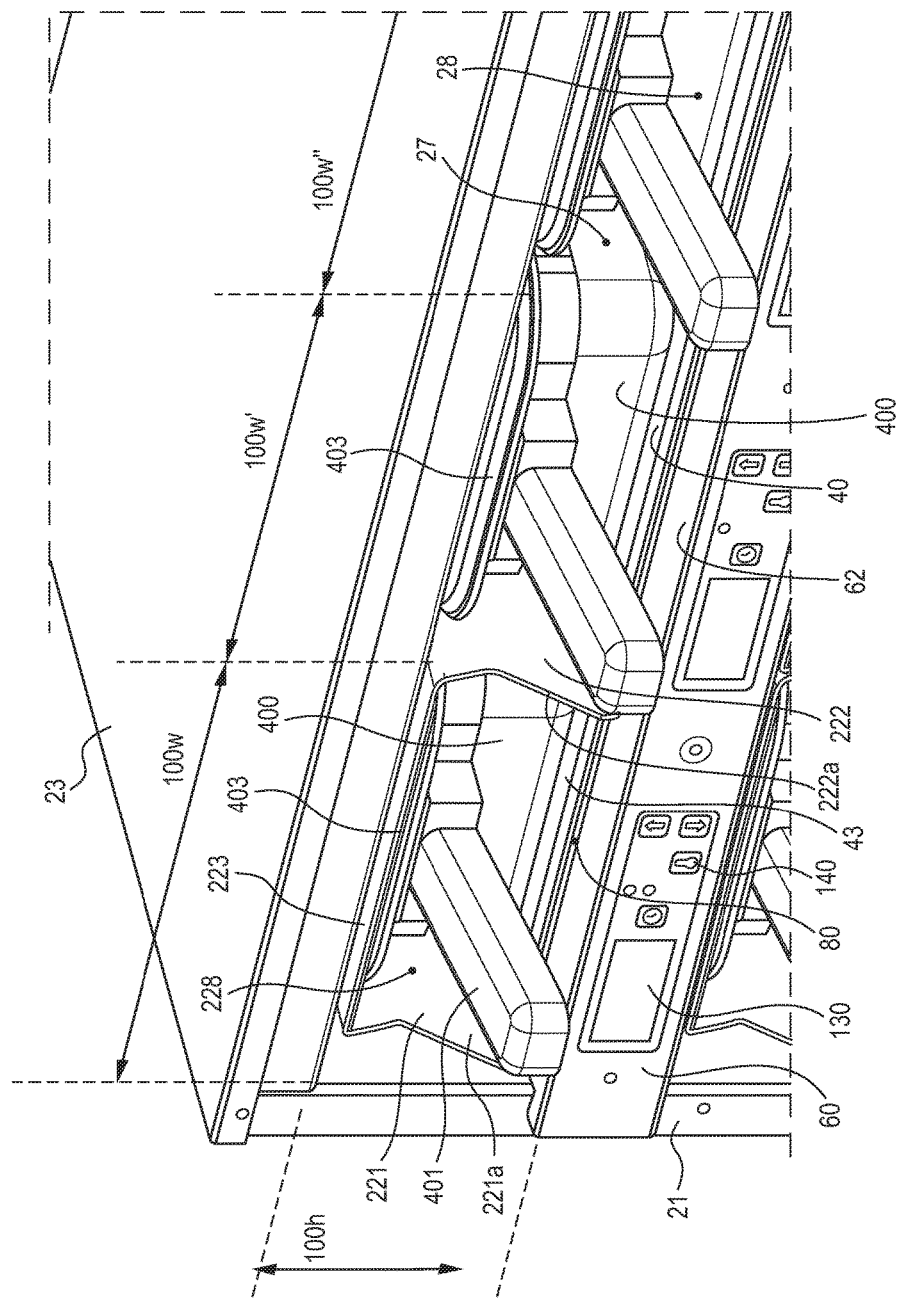
FIG. 3 is the view of FIG. 2 with two covers removed.

FIG. 3 depicts the view of FIG. 2 with covers 200 removed from the discrete heating zones identified by width 100*w*' and 100*w*''.

As discussed above and as depicted schematically in FIG. 10, which shows a plate 40 and a second plate (40') that normally rests above the plate 40 within the housing 20 exploded above the plate 40, each discrete heating zone (schematically shown with their neighboring widths 100*w*, 100*w*', 100*w*'', 100*w*''') may receive heat from a lower heater 501 that is disposed within the plate 40 and an upper heater that is disposed within the plate 40' (which, when assembled is located above the plate 40). The lower heater 501 may be disposed within the plate 40 above which the cover 200 extends and, when provided, the pan 400 rests) (with the discrete heating zone 100 above that plate 40) and the upper heaters 521, 522, 523, 524 disposed within the plate 40 (or upper wall 23) that is above the plate 40. In embodiments where discrete heating zones 100 are disposed above the bottom of the housing, the lower heater 501 may be within the bottom wall 24.

In some embodiments, the lower heater 501 (depicted schematically as a solid line within the plates 40, 40') may be a single electric heating element such as a resistance heating element that extends about the entire width of the plate 40. In some embodiments, the lower heater 501 may be a straight heating element, multiple straight heating elements powered from the same source, or a single heating element that is in a serpentine (as depicted) or in other patterns.

In some embodiments, the lower heater 501 may produce the same heat output per unit of length and may be disposed within the plate 40 such that the heat flow through upper surface of the plate 40 (i.e. the surface that the pan 400 and the rests upon) may be uniform (when the heater is disposed in a uniform manner), or substantially uniform through the entire surface of the plate 40. In other embodiments, the lower heater 501 may be formed from a heating element that generates more heat per unit length in some sections, and lower heat per unit length in other sections. In some embodiments, the lower heater 501 may be disposed such that the middle of the plate 40 may have more heat than the front and back and/or left and right side portions of the plate 40. One of ordinary skill in the art with a thorough review of this specification will appreciate that a suitable selection for a layout of the lower heater 501 would be only a product of routine optimization based upon the desired heating profile (either constant or cyclical, or based upon feedback control). In embodiments where the heater 501 is a single heater, the heater 501 may be controlled to be always on when the device 10 is on, or in other embodiments, a controller (1000, FIG. 1, shown schematically) may operate the heater 501 to maintain the temperature in the discrete heating zones 100 as desired, such as cyclically.

In other embodiments, the plate 40 may include multiple heaters 501, such as one heater 501 per discrete heating zone 100, with the controller 1000 controlling the heat to each heater 501 to maintain the desired temperature in the specific discrete heating zone 100.

One or more upper heaters 521 (522, 523, 524) may be provided within each plate 40 (and within the upper wall 23) to generate heat that is transferred into the discrete heating zone 100 that is below the respective plate 40 (and upper wall 23). As schematically depicted in FIG. 7, the upper heaters 521, 522, 523, 524 may be disposed above the discrete heating zone (100w, 100w', 100w", 100w''', respectively) such that the heat generated by the specific upper heater is directed to the discrete heating zone 100 disposed below the respective heater, but the neighboring discrete heating zones 100 do not receive a significant heat input from the upper heaters that are not directly thereabove. As can be understood with review of FIG. 7, discrete heating zone 100w receives heat from the lower heater 501, as well as the upper heater 521, the discrete heating zone 100w' receives heat from the lower heater 501 and the upper heater 522, etc. For ease of understanding the upper heaters 521, 522, 523, 524 are depicted in broken lines to visually differentiate them from the lower heater 501.

Figure 10:
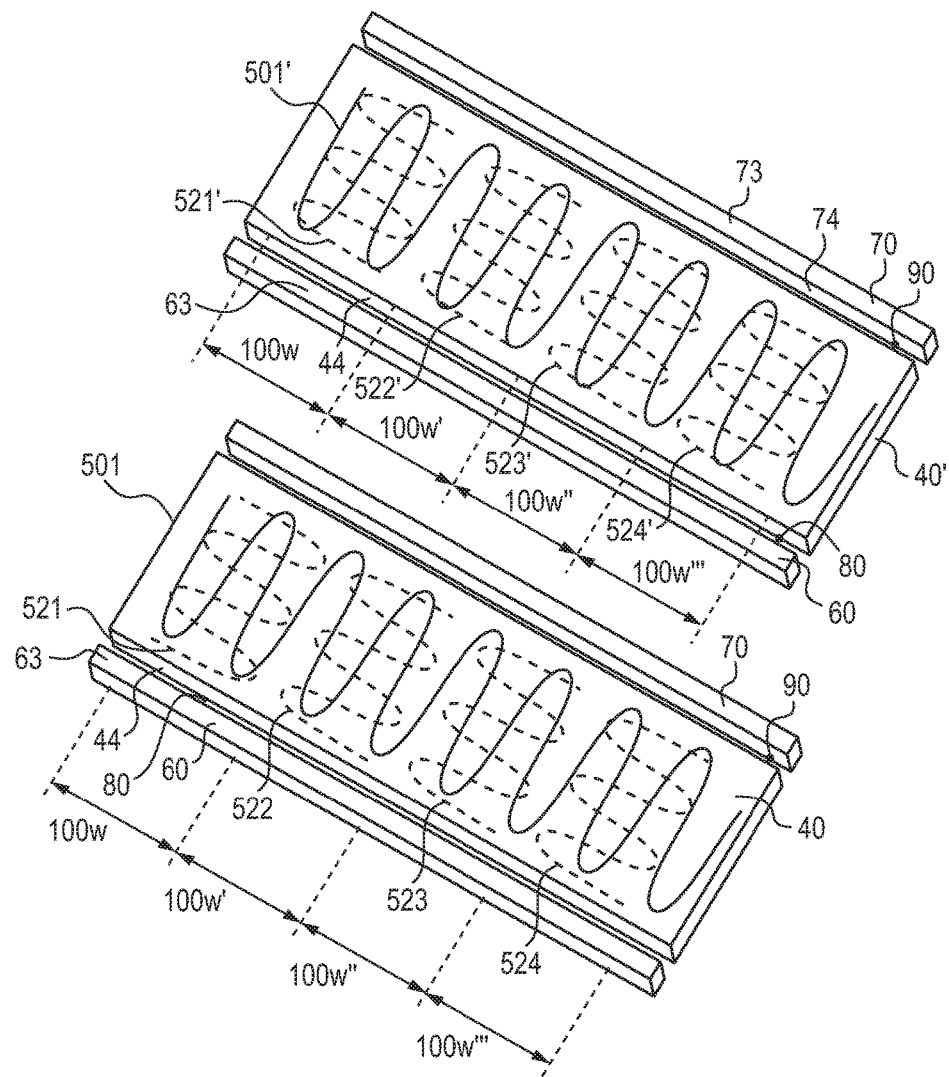
FIG. 10 is an exploded view of two sets of plates that collectively define several discrete heating zones of the modular holding cabinet of FIG. 1.

As shown in FIG. 10, each plate 40 (40') may include both a lower heater 501, and one or more upper heaters 521, 522, 523, 534 to allow the housing to maintain discrete heating zones in multiple levels of the housing 20.

The upper heaters 521, 522, 523, 524 may be similar heaters to the lower heater, and may be disposed in the specific or general orientation, or in a different orientation as the lower heaters. In FIG. 10, the upper and lower heaters are drawn to serpentine in opposite directions, which is drawn for the sake of differentiating the heaters in the figure, but the upper and lower heaters may be disposed in the same orientation and direction, or in different directions. In some embodiments, insulation may be provided between the upper heaters 521, 522, 523, 524 in a plate 40 and the lower heater 501 in the same plate, so that the heat generated by the respective heater travels generally through the surface of the plate 40 proximate to the plate and not in the direction of the other heater within the plate 40. While the name "upper" heater is used for elements 521, 522, 523, 524, the term "upper" refers to the location of that heater with respect to the discrete heating zone 100 that the heater interacts with, i.e. the "upper" heaters 521, 522, 523, 524 are disposed above the discrete heating zones, while the "upper heaters" may be disposed within the relative lower portion of the plate 40. Conversely, the "lower" heater 501 refers to the location of the heater with respect to the discrete heating zone 100 that the heater interacts with, i.e. the lower heater interacts with the discrete heating zone 100 that is directly above the plate 40 and the "lower" heaters 501 may be disposed in the upper portion of the plate 40.

The upper heaters 521, 522, 523, 524 may be individually controlled to maintain the temperature within the respective discrete heating zone 100 associated with the heater, such as controlled with a set duty cycle, or controlled based upon feedback from one or more temperature sensors that are disposed proximate to the specific discrete heating zone 100. As can be appreciated, the housing (and specifically the front end wall 60, and/or rear end wall 70) includes inputs 140 and displays 130 that are associated with each discrete heating zone 100, and the instructions inputted by the user (such as a timer, or controls to set a desired temperature or temperature range) may be used by the controller 1000 to operate the respective upper heater (and lower heater 501 in embodiments where the lower heater (or a portion of the lower heater may be controlled) as necessary to maintain the desired temperature within the zone). One of ordinary skill in the art will appreciate that controllers are well known that are capable of controlling one or more heaters based upon feedback systems to maintain a monitored location (such as a discrete heating zone) within a temperature range.

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

The invention claimed is:

1. A modular holding cabinet, comprising:
a housing comprising left and right side walls and a top wall above the left and right walls defining an internal volume therewithin, an open front that allows access into the internal volume, the housing supporting at least one plate disposed within the internal volume, the at least one plate extends between the left and right side walls and below the top wall,
the housing supports one or more end walls that are each spaced outboard from an end face of a respective one of the one or more plates such that an air gap is established therebetween;
the internal volume defining a plurality of discrete heating zones located above each of the one or more plates, each of the one or more discrete heating zones are configured to selectively receive heat from a first heater disposed within the respective plate and one of a plurality of second heaters disposed above the respective plate, wherein each of the plurality of discrete heating zones receives heat from a different one of the plurality of second heaters which is disposed vertically above the discrete heating zone,
the housing further comprising a plurality of displays and a plurality of inputs, with one of the plurality of displays and one of the plurality of inputs associated with each discrete heating zone, wherein each input is configured to receive user inputs associated with the operation of the respective discrete heating zone, and wherein each input is associated with controlling an operation of at least the second heater associated with the respective discrete heating zone,
further comprising one or more covers that are configured to be removably disposed within the internal volume, wherein the covers are dimensioned such that when positioned over the plate the cover partially encloses one of the discrete zones upon the plate and when centered above one discrete zone the cover does not interact with other discrete zones over the plate wherein each of the plurality of covers include a top wall and opposed left and right walls that extend from the top wall, wherein a front portion of one or both of the left and right walls includes a front foot that extends below a bottom edge of the respective left or right wall along a central portion of the cover, wherein the foot is configured to extend within the first air gap wherein the bottom edge of each of the left and right walls is scalloped above the foot such that when the foot extends within the air gap the bottom edge does not contact any portion of the plate.

2. The modular holding cabinet of claim 1, wherein each end wall includes the collective displays and inputs that are associated each of the discrete heating zones that are disposed above the plate associated with that end wall.

3. The modular holding cabinet of claim 1, wherein each end wall includes the collective displays and inputs that are associated with each discrete heating zone that is disposed below the plate that the collective displays and inputs are disposed upon.

4. The modular holding cabinet of claim 1, further comprising a rear opening into the internal volume from an opposite side of the housing as the open front, and further comprising one or more rear end walls that are each spaced outboard from a respective one of the one or more plates, wherein each of the rear end walls are spaced outboard of the respective plate with a second space provided between the rear end wall and a second end face, opposite the end face, of the respective plate.

5. The modular holding cabinet of claim 4, wherein the second space provided between the respective end rear wall and the second end face of the respective plate extends between the left and right walls.

6. The modular holding cabinet of claim 1, wherein the cover fully encloses an opening to a pan disposed therein when the pan is entirely disposed upon the plate.

7. The modular holding cabinet of claim 6, wherein a portion of the opening into the pan is not enclosed by the cover when a portion of the pan is disposed upon the end wall.

8. The modular holding cabinet of claim 6, wherein a portion of the opening into the pan is not enclosed by the cover when a portion of the pan is disposed over the air gap.

9. A modular holding cabinet, comprising:
a housing comprising left and right side walls and a top wall above the left and right walls defining an internal volume therewithin, an open front that allows access into the internal volume, the housing supporting at least one plate disposed within the internal volume, the at least one plate extends between the left and right side walls and below the top wall,
the housing supports one or more end walls that are each spaced outboard from an end face of a respective one of the one or more plates such that an air gap is established therebetween;
the internal volume defining a plurality of discrete heating zones located above each of the one or more plates, each of the one or more discrete heating zones are configured to selectively receive heat from a first heater disposed within the respective plate and one of a plurality of second heaters disposed above the respective plate, wherein each of the plurality of discrete heating zones receives heat from a different one of the plurality of second heaters which is disposed vertically above the discrete heating zone,
the housing further comprising a plurality of displays and a plurality of inputs, with one of the plurality of displays and one of the plurality of inputs associated with each discrete heating zone, wherein each input is configured to receive user inputs associated with the operation of the respective discrete heating zone, and wherein each input is associated with controlling an operation of at least the second heater associated with the respective discrete heating zone,
further comprising one or more covers that are configured to be removably disposed within the internal volume, wherein the covers are dimensioned such that when positioned over the plate the cover partially encloses one of the discrete zones upon the plate and when centered above one discrete zone the cover does not interact with other discrete zones over the plate wherein each of the plurality of covers include a top wall and opposed left and right walls that extend from the top wall, wherein a front portion of one or both of the left and right walls includes a front foot that extends below a bottom edge of the respective left or right wall along a central portion of the cover, wherein the foot is configured to extend within the first air gap;
wherein the first portion of each of the left and right side walls includes a horizontal portion that rests upon the front wall when the front foot extends into the air gap.

10. The modular holding cabinet of claim 9, wherein the front foot contacts a rear side of the front wall when the front foot extends into the air gap.

11. A modular holding cabinet, comprising:
a housing comprising left and right side walls and a top wall above the left and right walls defining an internal volume therewithin, an open front that allows access into the internal volume, the housing supporting at least one plate disposed within the internal volume, the at least one plate extends between the left and right side walls and below the top wall,
the housing supports one or more end walls that are each spaced outboard from an end face of a respective one of the one or more plates such that an air gap is established therebetween;
the internal volume defining a plurality of discrete heating zones located above each of the one or more plates, each of the one or more discrete heating zones are configured to selectively receive heat from a first heater disposed within the respective plate and one of a plurality of second heaters disposed above the respective plate, wherein each of the plurality of discrete heating zones receives heat from a different one of the plurality of second heaters which is disposed vertically above the discrete heating zone,
the housing further comprising a plurality of displays and a plurality of inputs, with one of the plurality of displays and one of the plurality of inputs associated with each discrete heating zone, wherein each input is configured to receive user inputs associated with the operation of the respective discrete heating zone, and wherein each input is associated with controlling an operation of at least the second heater associated with the respective discrete heating zone,
further comprising one or more covers that are configured to be removably disposed within the internal volume, wherein the covers are dimensioned such that when positioned over the plate the cover partially encloses one of the discrete zones upon the plate and when centered above one discrete zone the cover does not interact with other discrete zones over the plate wherein each of the plurality of covers include a top wall and opposed left and right walls that extend from the top wall, wherein a front portion of one or both of the left and right walls includes a front foot that extends below a bottom edge of the respective left or right wall along a central portion of the cover, wherein the foot is configured to extend within the first air gap,
further comprising a rear opening into the internal volume from an opposite side of the housing as the open front, and further comprising one or more rear end walls that are each spaced outboard from a respective one of a second end face of the one or more plates, wherein each of the rear end walls are spaced outboard of the respective plate with a second air gap provided between the rear end wall and a second end face, opposite the end face, of the respective plate,
wherein a rear portion of one or both of the left and right walls of the cover includes a second foot that extends below the bottom edge of the respective left or right wall along the central portion of the cover, wherein the second foot is configured to extend within the second air gap when the cover is positioned over the plate.

12. The modular holding cabinet of claim 1, wherein the cover can be removed from and installed into the housing to partially enclose one of the discrete heating zones without any tools.

13. The modular holding cabinet of claim 1, wherein the at least one plate is disposed within the housing in parallel with the top wall.

14. The modular holding cabinet of claim 1, wherein the one or more end walls each are aligned in parallel with a respective one of the one or more end plates that is associated with the respective end wall.

15. The modular holding cabinet of claim 1, wherein a top surface of each of the one or more end walls extends along the same plane as a top surface of the respective plate that is associated with the respective end wall.

16. The modular holding cabinet of claim 1, wherein one or more end walls extend outside of the internal volume of the housing.

\* \* \* \* \*

UNITED STATES PATENT AND TRADEMARK OFFICE
CERTIFICATE OF CORRECTION

PATENT NO. : 10,258,197 B1  
APPLICATION NO. : 15/202775  
DATED : April 16, 2019  
INVENTOR(S) : Fortmann et al.

Page 1 of 1

It is certified that error appears in the above-identified patent and that said Letters Patent is hereby corrected as shown below:

In the Claims

For Claim 2, Column 10, Line 64, after "associated" and before "each" insert the word --with--

Signed and Sealed this  
Third Day of November, 2020

Andrei Iancu  
*Director of the United States Patent and Trademark Office*